(12) United States Patent
Cadigan, Jr. et al.

(10) Patent No.: US 9,477,501 B2
(45) Date of Patent: *Oct. 25, 2016

(54) ENCAPSULATION OF AN APPLICATION FOR VIRTUALIZATION

(71) Applicant: International Business Machines Corporation, Armonk, NY (US)

(72) Inventors: Michael J. Cadigan, Jr., Poughkeepsie, NY (US); Howard M. Haynie, Wappingers Falls, NY (US); Scot H. Rider, Pleasant Valley, NY (US); Mushfiq U. Saleheen, Poughkeepsie, NY (US); Donald W. Schmidt, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 14/501,759

(22) Filed: Sep. 30, 2014

(65) Prior Publication Data

US 2015/0058848 A1  Feb. 26, 2015

Related U.S. Application Data

(63) Continuation of application No. 13/827,285, filed on Mar. 14, 2013, now Pat. No. 9,298,484.

(51) Int. Cl.
*G06F 9/455* (2006.01)
*G06F 13/36* (2006.01)
*G06F 9/54* (2006.01)
(Continued)

(52) U.S. Cl.
CPC .......... *G06F 9/455* (2013.01); *G06F 9/45558* (2013.01); *G06F 9/5077* (2013.01); *G06F 9/54* (2013.01); *G06F 9/3877* (2013.01); *G06F 13/36* (2013.01)

(58) Field of Classification Search
None
See application file for complete search history.

(56) References Cited

U.S. PATENT DOCUMENTS

| 2008/0104601 | A1* | 5/2008 | Kaneko ................ G06F 9/5027 718/103 |
| 2008/0118065 | A1* | 5/2008 | Blaisdell ............... H04L 45/745 380/255 |
| 2012/0151004 | A1 | 6/2012 | Pope |

(Continued)

OTHER PUBLICATIONS

Overview of IBM zEnterprise 196 I/O subsystem with focus on new PCI Express infrastructure T. A. Gregg et al. Published: Jan. 23, 2012.*

(Continued)

*Primary Examiner* — Emerson Puente
*Assistant Examiner* — Paul Mills
(74) *Attorney, Agent, or Firm* — Cantor Colburn LLP; Steven Chiu

(57) ABSTRACT

Embodiments relate to a method for encapsulating a hardware application for virtualization. The method surrounds the hardware application with a service layer controller and ring interfaces. The ring interfaces dictates a virtual function that the hardware application is running. The method controls the hardware application so that the hardware application is reset in between each of a plurality of running jobs. The method tags, by the ring interfaces, each of a plurality of requests with an identifier signifying a virtual function that the respective request belongs to. The method ensures that there are not any outstanding requests following a quiesce of the hardware application.

15 Claims, 7 Drawing Sheets

(51) Int. Cl.
*G06F 9/50* (2006.01)
*G06F 9/38* (2006.01)

(56) References Cited

U.S. PATENT DOCUMENTS

| | | |
|---|---|---|
| 2013/0145431 A1 | 6/2013 | Kruglick |
| 2014/0007098 A1* | 1/2014 | Stillwell, Jr. ....... G06F 9/30003 718/1 |
| 2014/0282506 A1 | 9/2014 | Cadigan et al. |

OTHER PUBLICATIONS

Vuletic, et al. "Seamless Hardware-Software Integration in Reconfigurable Computing Systems". Configurable Computing: Fabrics and Systems. IEEE Design & Test of Computers. pp. 102-113. Mar.-Apr. 2005.

Yang, et al. "Accelerating thread-intensive and explicit memory management programs with dynamic partial reconfiguration". J. Supercomput (203) 63:508-537. Dec. 11, 2012.

Bartzoudis et al., "Concurrent monitoring of PCI bus transactions for timely detection of errors initiated by FPGA-based applications" IMTC 2007; 2007 IEEE, 5 pgs.

Carlier et al., "Profibus-DP to G-64 Configurable Interface", Published Apr. 6, 2001; Geneva, Switzerland; CERN-SL-2001-052-BT; 5 pgs.

Hung, Chin-Chieh Reconfigurable Hardware Module Sequencer for Dynamically Partially Reconfigurable Systems; A Thesis Submitted to the Institute of Computer Science and Information Engineering; National Chung Cheng University; Jul. 13, 2007; 78 pgs.

Taylor et al., "Dynamic hardware plugins: exploiting reconfigurable hardware for high-performance programmable routers", Computer Networks 38 (2002); pp. 295-310.

Kilinx "Virtex-7 FPGA Gen3 Integrated Block for PCI Express" Product Guide; PG023; Apr. 24, 2012; 81 pgs.

* cited by examiner

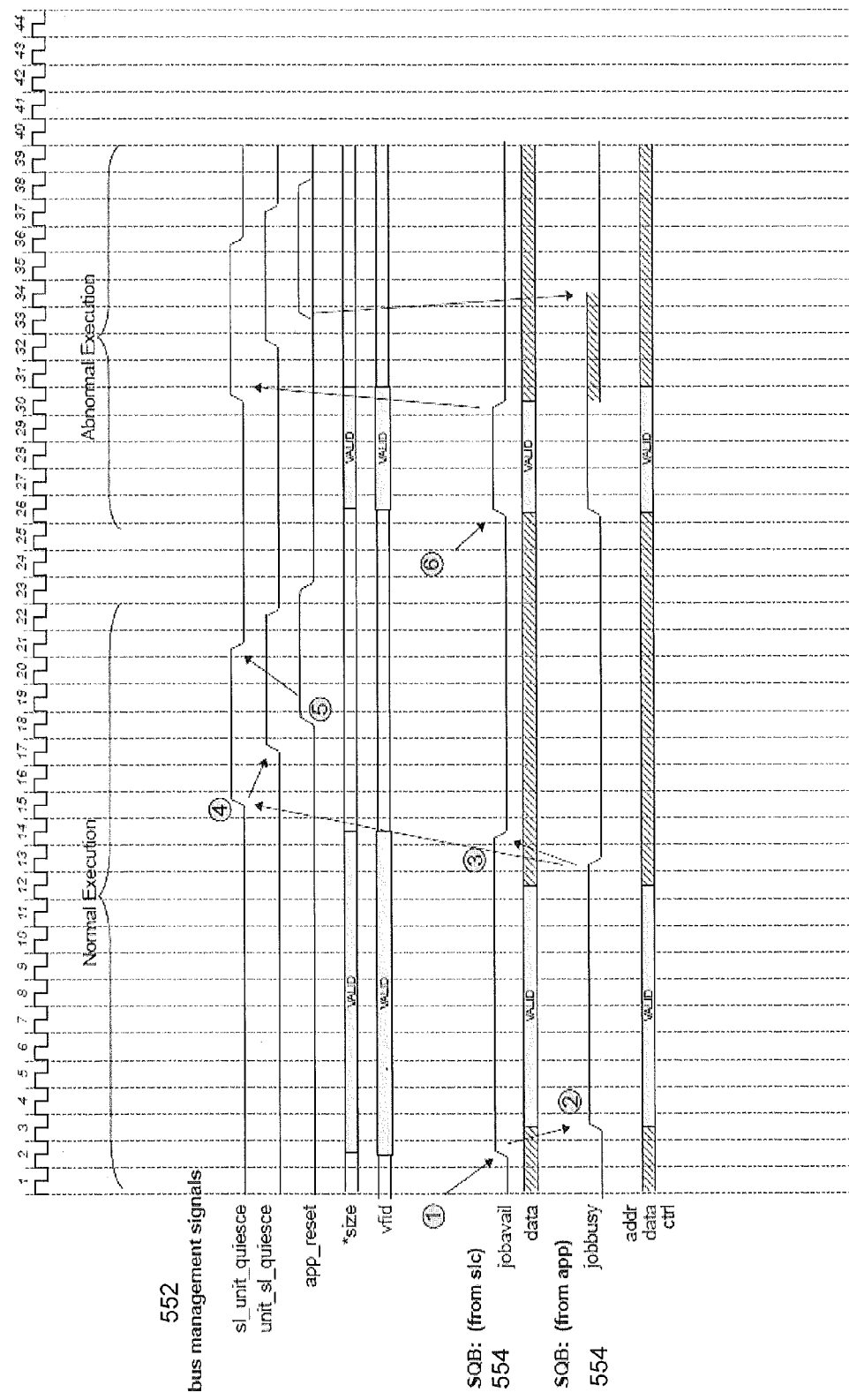

ENCAPSULATION OF AN APPLICATION FOR VIRTUALIZATION

CROSS-REFERENCE TO RELATED APPLICATION

This application is a continuation of U.S. patent application Ser. No. 13/827,285, filed Mar. 14, 2013, the disclosure of which is incorporated by reference herein in its entirety.

BACKGROUND

The present invention relates generally to computing technology, and more specifically to the encapsulation of an application.

Applications for a computing platform may be developed to provide for one or more functions. For example, in connection with a virtual environment, a hardware application typically includes special or dedicated elements controlling the virtual nature. While many vendors offer "system on a chip" solutions, none presently offer a virtualization solution "out of the box."

BRIEF SUMMARY

An embodiment is directed to a computer system comprising a service layer controller. The method comprises surrounding the hardware application with a service layer controller and ring interfaces, wherein the ring interfaces dictate a virtual function that the hardware application is running. The method comprises controlling the hardware application so that the hardware application is reset in between each of a plurality of running jobs. The method comprises tagging, by the ring interfaces, each of a plurality of requests with an identifier signifying a virtual function that the respective request belongs to. The method comprises ensuring that there are not any outstanding requests following a quiesce of the hardware application.

An embodiment is directed to a computer program product for encapsulating a hardware application for virtualization. The computer program product comprises a computer readable storage medium having program code embodied therewith. The program code is executable by a device to surround the hardware application with a service layer controller and ring interfaces, wherein the ring interfaces dictate a virtual function that the hardware application is running. The program code is executable by the device to control the hardware application so that the hardware application is reset in between each of a plurality of running jobs. The program code is executable by the device to cause, by the ring interfaces, each of a plurality of requests to be tagged with an identifier signifying a virtual function that the respective request belongs to. The program code is executable by the device to ensure that there are not any outstanding requests following a quiesce of the hardware application.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 7 depicts an exemplary timing diagram in accordance with one or more embodiments.

DETAILED DESCRIPTION

Figure 1:
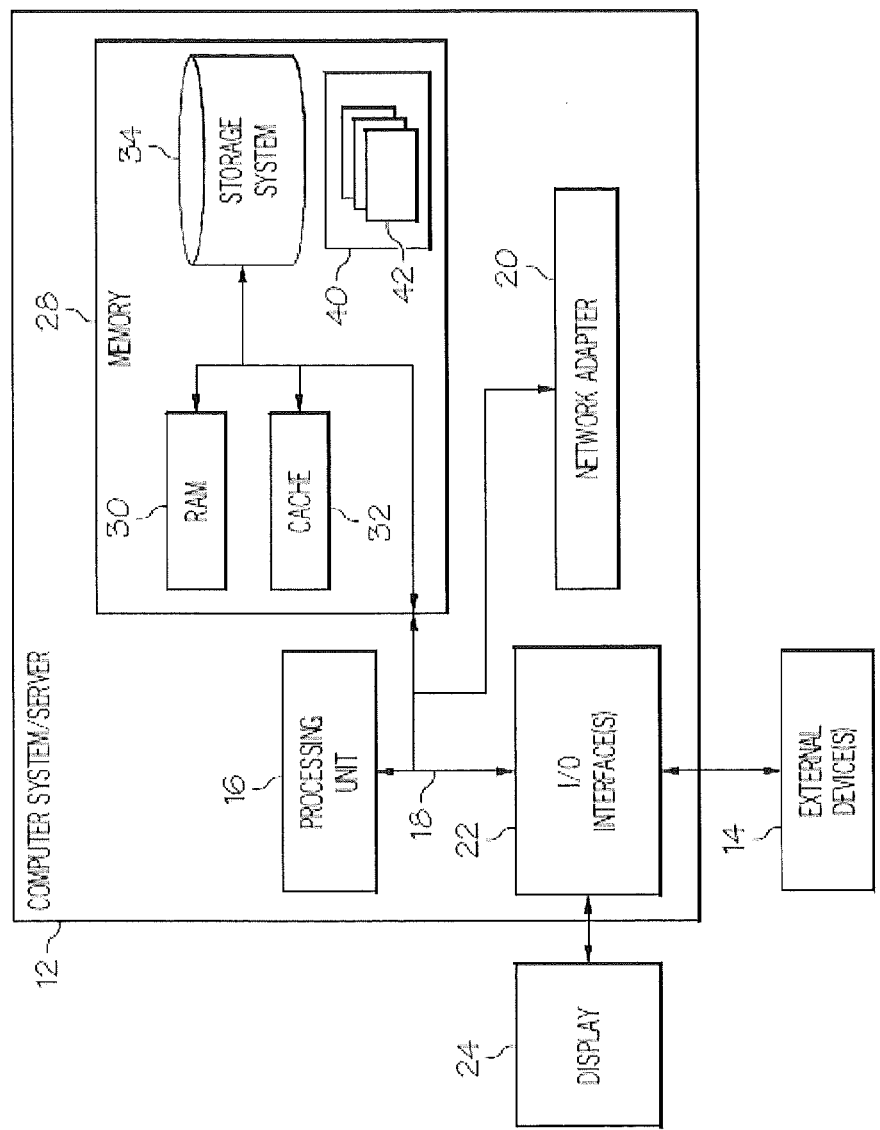
FIG. 1 depicts a cloud computing node according to an embodiment of the present invention.

Embodiments described herein are directed to methods, apparatuses, and systems for providing a set of reusable design elements that enable an application to be connected to a plurality of interconnect fabrics. These design elements may control one or more of: (1) a resetting the application, (2) a delivery of software work elements that tell the application what to do, (3) a monitoring of the application for bus or bandwidth usage and duration, (4) a handling of errors occurring within the application so that the error is contained or isolated to the virtual manager running that job, (5) a managing of the communication of the application to external endpoints so that it appears virtual to a host, (6) a stopping of the application in case of error or runaway bus usage in such a way that it does not interfere with other traffic on an interconnect fabric and that the interconnect fabric can continue to run (bus quiescing) (7) a putting or placing of the application into a known state (reset) at the beginning of each virtual job, (8) a fencing of the application into an electrical state to enable in-situ partial reconfiguration of that application for technologies that support partial reconfiguration.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
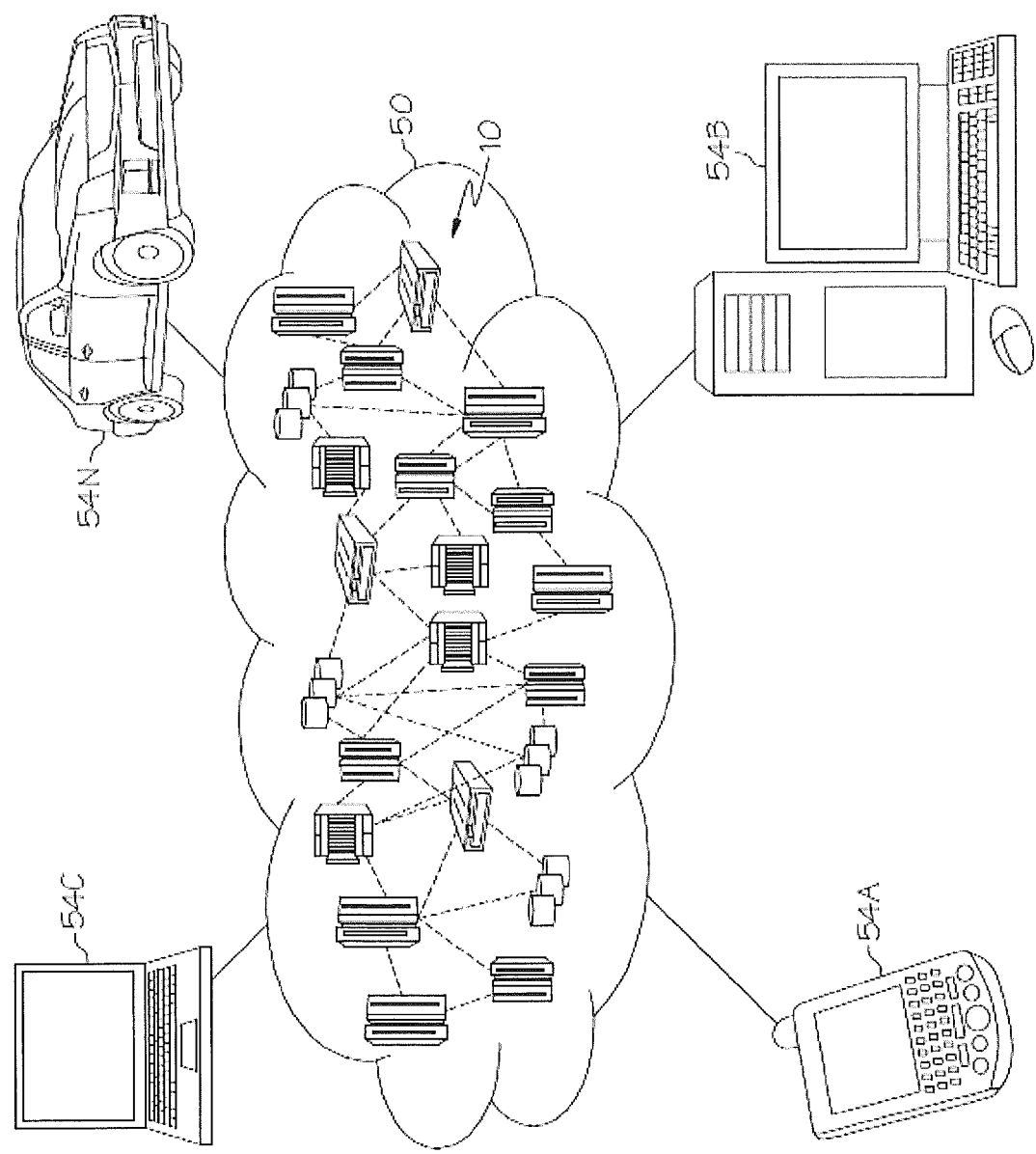
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
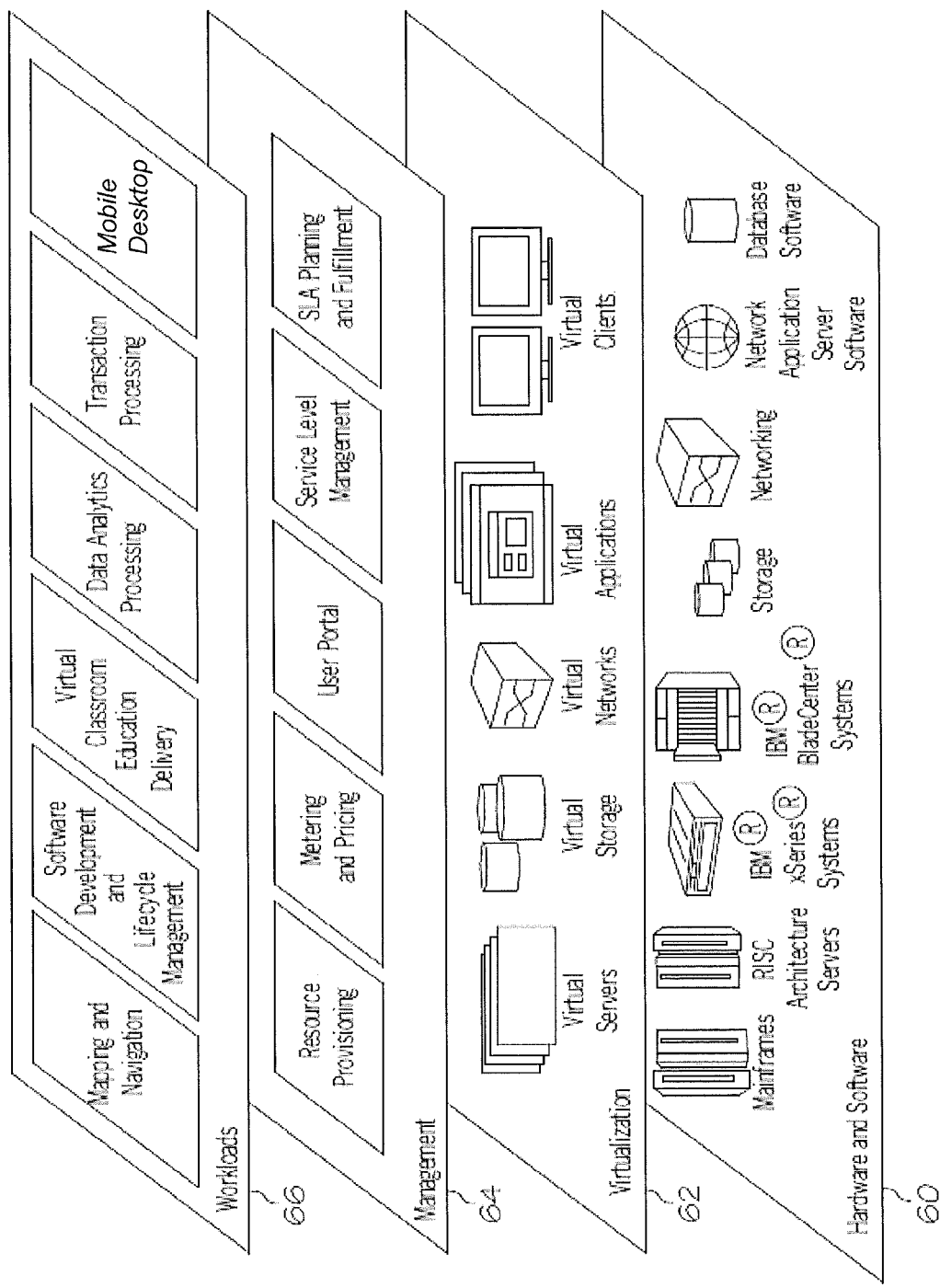
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

In some embodiments, a hardware application may be virtualized. The virtualization may occur in accordance with the virtualization layer 62 described above with respect to FIG. 3. In some embodiments, a hardware encapsulation mechanism may be used within, e.g., a field-programmable gate array (FPGA) and/or an application specific integrated circuit (ASIC) to virtualize the hardware application via one or more interfaces. The interfaces may be controlled by a trusted hardware supervisor layer. This hardware layer may be controlled by a privileged code while the application may be controlled by a device driver running within a virtual machine (VM).

Figure 4:
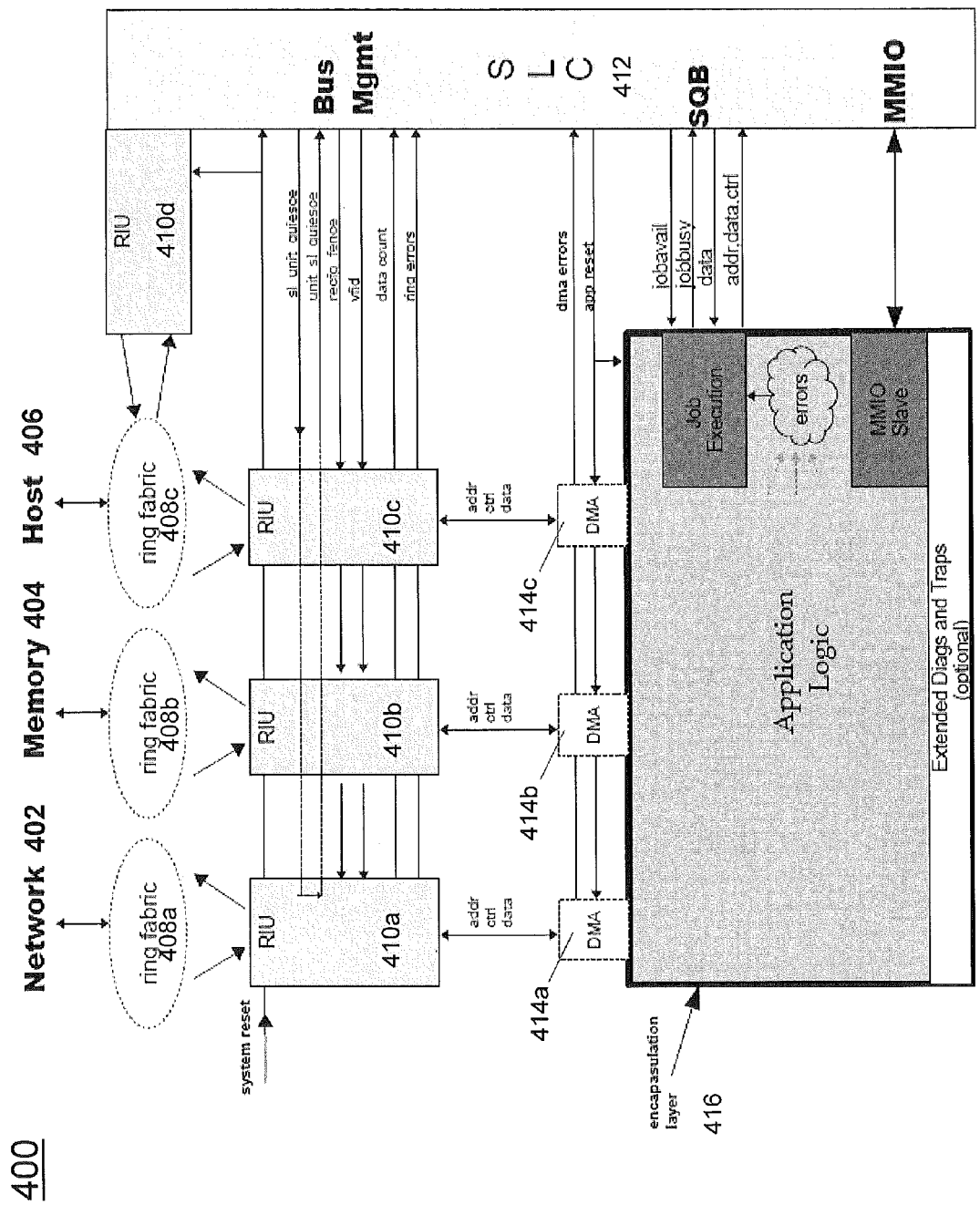
FIG. 4 depicts an exemplary system environment in accordance with one or more embodiments.

Referring to FIG. 4, a system 400 in accordance with one or more embodiments is shown. The system may include one or more "endpoints", such as a network 402, a memory 404, and a host 406. The network 402 may be used to access an Ethernet, Fiber channel or media controller (MAC). The memory 404 may include an external memory bank (e.g., DRAM, Flash, etc.). The host 406 may include a bridge interface to a host processor, typically via a PCIexpress network or embedded via PLB or Powerbus in the case of, e.g., a system-on-a-chip (SOC) ASIC design.

The endpoints may connect to a (one or more) topologies, such as ring fabric (switch) 408a through 408c. The ring fabric 408a-408c may interconnect a plurality of ring interface units (RIUs) 410a through 410d. The RIUs 410a-410d may be used to provide a consistent user interface back to the application and may include one or more of an address, data, and a set of control lines to control flow, data transfer size and direction, and error indicators.

A service layer controller (SLC) 412 may be used to connect into the ring fabric 408. Such a connection may be used to provide access to the host 406.

In some embodiments, a direct memory attachment (DMA) controller, denoted by reference characters 414a, 414b, and 414c in FIG. 4, may be used as an interface between a user interface (UI) of the RIUs 410a-410c and the application.

The application itself may be designed within an encapsulation layer 416. Within the application or the encapsulation layer 416 there may exist defined interfaces to the DMA (or RIU), a defined service queue bus (SQB) which may deliver an architected set of command to the application, and a memory mapped input output (MMIO) bus that may be used for non-virtual diagnostic purposes. In the diagnostic mode, the application may become an extension of a service layer's memory space.

The RIUs 410 may provide an access medium to the fabric 408.

The RIUs 410 may provide a set of commands, such as read request, write request, read response, and write response.

The RIUs 410 may provide a flow control mechanism to prevent deadlocks and use ring bandwidth efficiently.

The RIUs 410 may provide an address bus large enough to cover the memory space for the application's resources.

The RIUs 410 may provide a data bus large enough to satisfy bandwidth requirements. The data bus may interleave with the address bus.

The RIUs 410 may provide a tag bus. A tag may be used to couple requests with corresponding responses. The RIUs 410 may correlate requests and responses and maintain a state indicating whether there are outstanding requests pending responses.

The RIUs 410 may provide a virtual function identifier (VFID). The VFID is described further below.

As described above, in some embodiments a hardware application may be virtualized. In some embodiments, the application may be reset and/or restarted without disturbing the infrastructure (e.g., the fabric 408) around the application which may be performing tasks not related to the function of the application. If the SLC 412 could be sure the application was in a state where there are no pending requests (effectively absent from the fabric), the SLC 412 may change the state of the application without affecting the neighboring infrastructure.

An RIU 410 may keep track of the number of requests and responses made and received from the application. This may be done using a "tag" design where each request may be tagged with a unique identifier (e.g., a unique number) and when the response is returned from an endpoint, the identifier may be returned. The RIU 410 may watch the tags to maintain knowledge of when there are no requests out to the endpoint pending.

When a signal (sl_unit_quiesce in FIG. 4) from the SLC 412 is asserted indicating that the presently working job has ended is sent to the RIU 410, the RIU 410 may stop making new requests on the fabric 408. The RIU 410 may then wait for all responses pending to complete, corresponding to a "request neutral state." When this occurs, the RIU 410 may assert a signal (unit_sl_quiesce in FIG. 4) back to the SLC 412 (or looped into the next RIU, which will trigger this action there). When all RIUs 410 connected to the application have indicated they are in the request neutral state, the SLC 412 may be enabled to reset the application without adversely impacting the fabric 408. Otherwise, such adverse impacts could include one or more of:

(1) beaconing, wherein a runaway (unreliable) application constantly imposes requests on the bus.

(2) unsolicited responses. An unsolicited response may be a response that is returned based on a request that is no longer valid. If the application is reset and a new job is started, there cannot be a request from a previous job still outstanding on the fabric or the new job might not function properly.

(3) a complete timeout to a response. After a timeout on the return of the unit_sl_quiesce (as determined by the SLC 412), the SLC 412 can escalate the problem to a system level error (e.g., the host is not responding).

(4) loss of tags (performance degradation). By insuring that all tags are returned after each job, performance degradation between jobs may be avoided.

(5) illegal change of state, e.g., breaking the protocol of the ring fabric 408. Without this feature, a sudden reset of the application could cause a system-wide crash.

In some embodiments, the SLC 412 may isolate (e.g., logically isolate) the application from the fabric 408. In some embodiments, the isolation may extend to electrical isolation. Electrical isolation may be used in connection with (partial) reconfiguration operations, such as a dynamic reprogramming of an FPGA device. The recfg_fence signal in FIG. 4 may be asserted by the SLC 412 to those RIUs 410 that are connected to the application. The RIUs 410 may set their user interface outputs to the electrical state required to enable the partial reconfiguration state required by the manufacturer for that device while logically maintaining the idle state with respect to the ring fabric 408. The service layer may isolate its own buses (e.g., SQB, MMIO) accordingly.

In some embodiments, an RIU 410 may indicate to the SLC 412 how much data has moved through the RIU 410 to the fabric 408 during the course of the job. Such a feature may be exploited in instances where revenue is generated or received based on available or utilized bandwidth. The data movement may be reported back to the host application (VM), without being manipulated by software running on the host machine or the hardware application itself.

In some embodiments, an RIU 410 and/or a DMA 414 may report errors back to the SLC 412. An example would include bad DMA responses due to incorrectly calculated read pointers. Although the application may have the capability to report such errors, additional checking performed by the RIU 410 or the DMA 414 may be used to increase reliability since the RIU 410 and the DMA 414 may function independent of the application. Isolation may be provided between errors generated by the application and errors generated by the fabric 408. Errors generated within the application and known to be caused by the application can be confined to the present job running on the application and the SLC 412 may merely end it, perform the quiesce operation, and reset the application and start a new job; the error might only be reported back to the VM. The application might not interfere with any job other than the one that is currently running.

As shown in FIG. 4, the SLC 412 may provide to one or more RIUs 410 a VFID signal. The VFID signal may be set on behalf of the application. The VFID may be derived by the SLC 412 based on a queue a job originated in. The VFID may be a hashed unique identifier that represents the queue (VM or "LPAR") associated with a work request the application is executing. For example, in a PCIexpress system environment, a BAR address that may be used to access the queue may serve to determine a virtual function number associated with the request. This function number may become the VFID. The SLC 412 may assert this identifier to one or more RIUs 410 performing data transfers for the application. The Rills 410 may associated every request (and subsequent response) moving through the fabric 408 with that VFID so that any error seen outside of the application can be reported to the appropriate host or VM.

When the VFID reaches a designated endpoint, a respective virtualization technique may be performed by the endpoint. For example, in PCIexpress, the VFID may be replaced with the "requesterID" field in the PCIe transaction layer protocol. The requesterID may be associated by the host during configuration to correspond to the work queue the request is associated with (opci: PCISIG: Single Root IO virtualization via PCI express). In the case of a memory interface, a memory controller may perform a previously defined address translation corresponding to this VFID when the queue was initialized. For example, the memory controller may use the VFID as an extension to upper address bits to ensure that a section of memory is dedicated to that virtual function and only accessible to that virtual function. Similarly, in a networking context, an IP address may be associated with the VFID.

The application might not know of the VFID, much less adjust or manipulate the VFID. As such, the application might not influence the virtualization process of the transaction. The application might not impact or influence the operation of any other VM except potentially the VM the job is running on.

Figure 5:
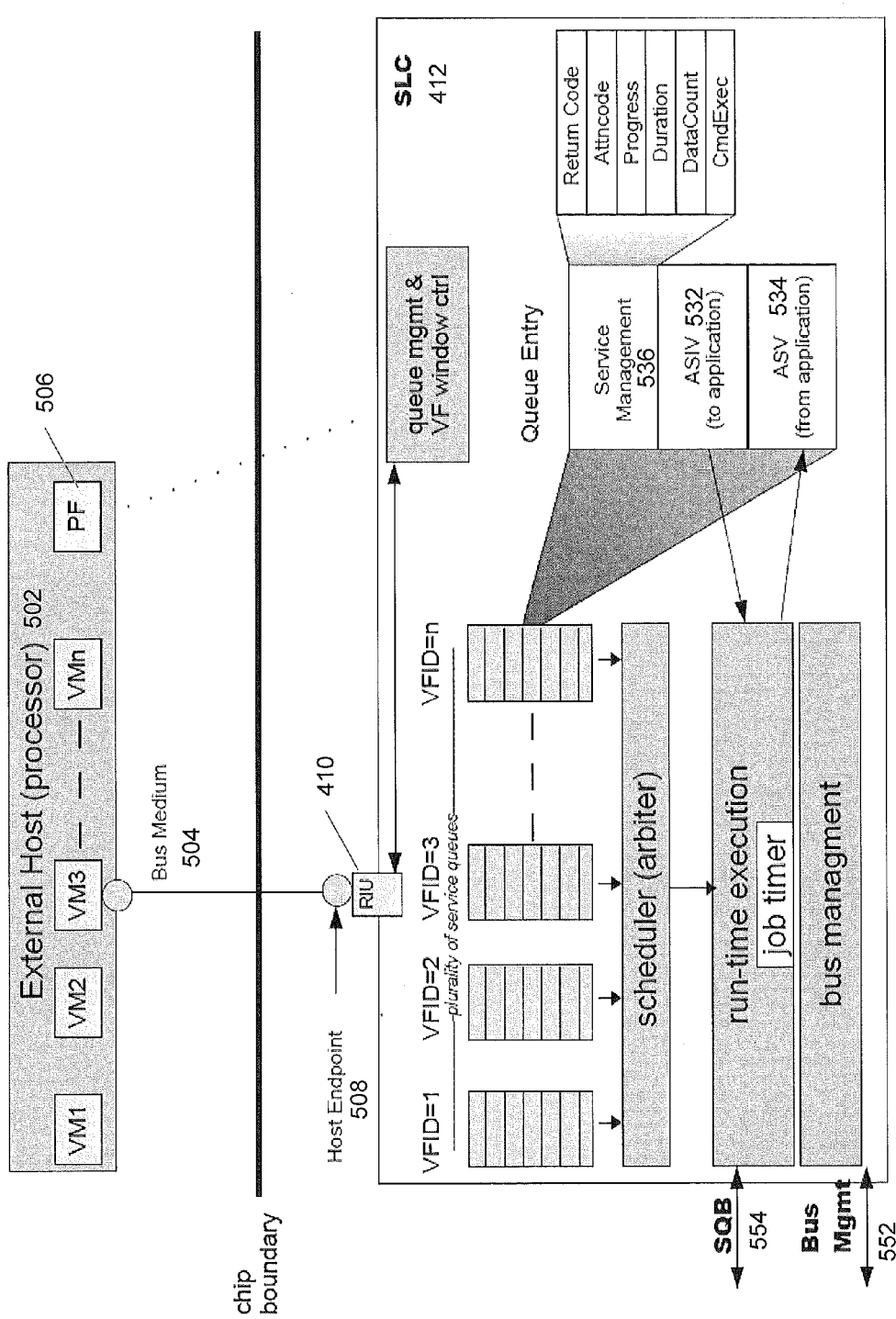
FIG. 5 depicts an exemplary system environment in accordance with one or more embodiments.

Turning now to FIG. 5, an exemplary embodiment of the SLC 412 is shown. The SLC 412 may interface to an external host processor 502. The host processor 502 may include a number 'n' of VMs: VM1, VM2, VM3, . . . VMn. The host processor 502 may connect to the device via a bus medium 504, such as PCIe. The host processor 502 may include a physical function (PF) 506. The PF 506 may have supervisory access to the device, potentially using a hypervisor or supervised kernel process. Access may be obtained to the bus medium 504 by the SLC 412 via a RIU 410 connected to a host endpoint 508.

MMIO accesses made by VM processes on the host 502 to the SLC 412 via the bus medium 504 may be decoded by the device as a VFID, which may correspond one-to-one back to the VM. In some embodiments, upper address bits may be used as the VFID and/or hashing techniques may be used to generate the VFID. The host 502 may control what address each VM can use. The VMs may be confined to accessing addresses that the SLC 412 may uniquely decode into a VFID and likewise target a specific queue dedicated to that VM. On these queues, the VMs may create work requests to the application. In some embodiments, the application might not be exposed to this process, the VFID, or the workings of the queue.

In some embodiments, the queue entries may contain an application specific invariant (ASIV) section 532 that may include data intended to be read by the application, an application specific variant (ASV) section 534 that may include data sent back from the application, and a service management section 536 maintained by the SLC 412.

The SLC 412 may maintain control over the application via one or more (e.g., two) internal buses. A first of the buses, bus management (mgmt) 552, may be connected to an RIU 410 around the application that controls isolating the application from the ring fabric 408. The bus mgmt 552 may be used in conjunction with starting and completing jobs. The signaling for the bus mgmt 552 was described above.

A second of the buses, the service queue bus (sqb) 554 may interface directly to the application. The sqb 554 may include one or more of the following:

(1) a job availability/job busy handshake facility. A job availability signal (jobavail in FIG. 4) may be asserted to alert the application that there is a job to be executed. A job busy signal (jobbusy in FIG. 4) may be returned from the application to acknowledge the request and may be deasserted or removed when the execution is complete.

(2) a plurality of address, data, and/or control signals. These signals may be used to read and write the ASIV 532/ASV 534 data associated with a work request. A position the data is placed in the ASIV 532/ASV 534 may be determined a-priori by the design of the application and published in its specification (e.g., programming API). The application might only see this copy of the data for the specific queue element the SLC 412 has selected. The application might not access the queue element, thereby preventing the application from interfering with or corrupting the queues. In some embodiments, parity may be used on the sqb 554 to provide further protection against corruption of the queue.

(3) a set of control signals to indicate whether the data being sent to the SLC 412 is intended for the ASIV 532 or special control operations. The following control operations may be defined: (a) progress: this is a message that the SLC 412 will transmit back up to the host 502 on behalf of the application that goes in the service management section 536 of the queue element, (b) attncode: this is a message that the SLC 412 will transmit back up to the host 502 on behalf of the application and includes a pre-established protocol for generating an interrupt to the VM controlling this queue, (c) return code: this is a designation indicating how the execution of this job concluded.

In some embodiments, the service layer may overwrite one or more of the aforementioned fields if it detects an error in the operation of the application with diagnostic information intended for the device driver of the VM.

In some embodiments, the sqb 554 signals might only be used when the SLC 412 has asserted jobavail; the SLC 412 may ignore the sqb 554 signals otherwise.

Figure 6:
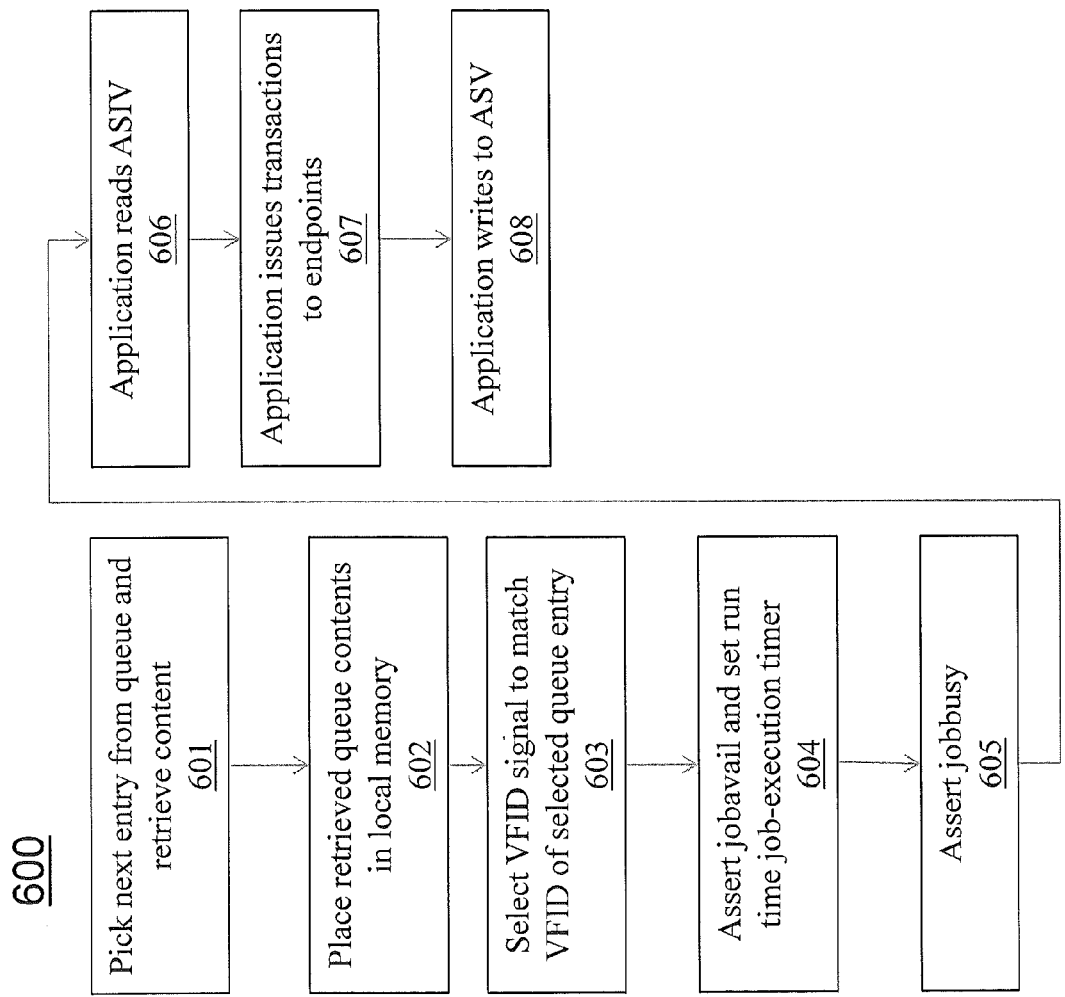
FIG. 6 depicts a flow chat of an exemplary method in accordance with one or more embodiments.

Once one or more work requests are placed in the queues, operations may proceed as follows, in reference to FIG. 4, FIG. 5 and the method 600 of FIG. 6.

In block 601, a scheduler may pick the next entry from one of the queues and retrieve from the host 502 the content of the queue entry (service management 536 and ASIV 532 section). Retrieval may be done via the RIU 410 using the VFID associated with the selected queue so the request is forwarded at the host 502 to the VM owning the queue. The SLC 412 may maintain pointers for these queues.

In block 602, the retrieved contents of the queue may be placed in local memory for access by the sqb bus 554. The ASIV 532 may be read by the application, and the ASV 534 may be written, although the application might not have visibility into such features yet. The service layer may perform reliability checks on the contents of these structures before proceeding.

In block 603, the SLC 412 may select a VFID signal to match the VFID of the selected queue entry.

In block 604, the SLC 412 may assert the sqb 554 signal jobavail to the application (see FIG. 7, circle 1) and a run time job-execution timer may be set. The amount of time allowed to this queue entries execution may be set by the PF 506 on behalf of this processor 502 during an initialization of an adapter. The application or VM might not be able to manipulate this. The SLC 412 may enable the remaining sqb 554 bus signals to the control of the application.

In block 605, the application may assert the sqb 554 signal jobbusy (see FIG. 7, circle 2) back to the SLC 412 indicating it has acknowledged the work request.

In block 606, using the sqb bus 554 the application may directly read the ASIV 532 from the queue entry the SLC 412 previously set up.

In block 607, and specific to the function contained with this queue entry, the application may issue necessary transactions to the endpoints via the DMA 414/RIU 410 connections as these are now live-connected to the application. Every request may be automatically tagged with the correct VFID and the application may be virtualized.

In block 608, the application may write to the ASV memory 534 set up by the SLC 412 and may issue progress and attentions. The service layer may forward these to a previously established location (e.g., per information in the service management section 536 of the queue, or the configuration of the queue) using, e.g., the VFID for this queue entry to target the appropriate VM. Any interrupts generated by attention commands may be associated with the VFID and directed to a processor servicing this VM.

The method 600 (or a block or portion thereof) may continue or repeat until either the application ends the job (normal termination) or the SLC 412 ends the job (abnormal termination). While the job is running, the SLC 412 may accumulate the data count signals from the RIUs 410 keeping track of the amount of bandwidth used by the application.

The application may continue to work provided the job-execution time (block 604 of FIG. 6) has not expired and an error has not be asserted by the RIU 410/DMA 414 or service layer itself. The application may indicate completion by writing a return code instruction into the sqb bus 554 and then deasserting the sqb 554 signal jobbusy. FIG. 7 illustrates a timing diagram of event when the SLC 412 detects the deassertion of the jobbusy signal.

In circle 3 of FIG. 7, the SLC 412 may deassert the sqb bus 554 signal jobavail and disconnect access to the sqb bus 554.

In circle 4 of FIG. 7, the SLC 412 may assert the sl_unit_quiesce signal to the RIUs 410. The RIUs 410 might not transmit any requests on behalf of the application.

The SLC 412 may wait for acknowledgement from the RIUs 410 regarding the quiesce. The job-execution timer may be running. If the RIUs 410 do not quiesce before this timer expires, a checkstop of the adapter may occur.

When the SLC 412 samples unit_sl_quiesce asserted from the RIUs 410 (or daisy-chained form the last one in the chain), the SLC 412 may assert the app_reset signal (circle 5 of FIG. 7). The assertion of the app_reset signal may reset the application and DMA 414 engines. The RIU 410 and the fabric 408 may remain undisturbed.

The SLC 412 may deassert the sl_unit_quiesce signal, wait for the handshake unit_sl_quiesce to deassert and then release the app_reset on the application.

The SLC 412 may transmit the ASV 534 up to the host (e.g., host 502) as per the queue entry on behalf of the VFID of this queue.

The SLC 412 may set a duration field to indicate how long this job took to execute and may place that as well as the final data counts into the job management section or service management section 536 of the queue entry. The SLC 412 may transmit the job management section of the queue entry back to the host on half of the VFID of this queue. The host may see the return code updated in its local copy and process this queue entry. The SLC 412 may trigger an interrupt to the respective VM to indicate the completion, potentially based on a configuration setting for the queue or information passed down in the queue entry.

The SLC 412 may manipulate the queue pointers for this queue so that the next entry can be retrieved.

The SLC 412 schedule may then pick another job from this or another queue and being the process or algorithm again. While the previous job was running, a new job may be prefetched on the adapter.

If the job-execution timer expires, the same or similar action as a normal termination condition may be taken except the service layer might not wait for the sqb bus 554 jobbusy signal to deassert. The service layer may merely lower the jobavail signal (circle 6 of FIG. 7) and proceed to the quiesce operation. Despite the abnormal termination, the next selected job may be issued to the application after the app_reset sequence. This may be acceptable or safe, as there might not be any outstanding host requests, the application may be in its reset state, and the fabric may be unaffected by the error.

In some embodiments, a special VM may be designated the PF 506 and may control the management of the device. The PF 506 may typically run under the control of a kernel or supervisory process running on a host (e.g., host 502). The SLC 412 may detect access by the PF 506 in a manner similar to how the SLC 412 decodes the VFID of the VM. This VFID (which may be referred to as VFID=0 in some embodiments) might not access the device via queues but through direct MMIO, potentially using a windowing technique (e.g., using a static register to set which VFID is targeted by subsequent MMIOs). The PF 506 may access memory on the device that would be associated with the VM queues for purposes of diagnostics and initialization. A register space through this VFID may map to a simple register access bus (MMIO) to extend diagnostic operation into the application.

While some of the examples described herein relate to the use of one application, in some embodiments multiple applications may each run off a different queue element from the same or different VMs all interconnected into the same fabric. This may be done by parallelizing the runtime execution and bus management elements of the SLC.

Technical effects and benefits include a definition for designing and implementing a hardware application (e.g., hardware accelerator, specialized processing core) such that the hardware application can be used in any virtual environment without the hardware application having any special design elements controlling the virtual nature. In some embodiments, the application may be physically isolated from any hardware responsible for controlling the virtual functionality of the chip or device. Reuse may be encouraged by being able to fit a plurality of different kinds of applications within a reusable virtual framework. Targeted applications or functions include compression, decompression, encryption, sorting, database queries, numerical analytics (DSP), scientific computing, etc.

Embodiments may be used to enable functional verification activities to concentrate on a core of an application, potentially without having to consider the complexities of a virtual nature of a platform. A robust design environment may be provided to develop reliable hardware accelerators for use in complex virtual memory environments. Physical encapsulation may be provided to ensure that any programming errors associated with the execution of the application can only impact the VM running the application and not impact other VMs.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for encapsulating a hardware application for virtualization, wherein the method is implemented in a system comprising a host system including a processor connected to a ring fabric, a service layer controller (SLC) connected to the ring fabric, at least one ring interface unit (RIU) connected to the ring fabric, and the hardware application connected to the RIU and the SLC, the method comprising:
   isolating, by the SLC, the hardware application from the ring fabric by controlling interfaces, including at least the RIU, by which the hardware application accesses the ring fabric and communicates with the host system;
   running, by the host system, a plurality of virtual machines (VMs);
   creating, at the SLC, a plurality of virtual function queues each dedicated to a respective one of the VMs;
   receiving, by the SLC, a plurality of jobs created by the VMs and storing each received job in the queue dedicated to the respective VM that created the received job;
   selecting, by the SLC, a first job of the stored jobs and signaling the hardware application that the first job is ready for execution;
   executing, by the hardware application, the first job and writing results of executing the first job to the SLC; and
   returning, by the SLC, the results to the respective VM that created the first job.

2. The method of claim 1, further comprising:
   issuing, by the hardware application as part of executing the first job, a plurality of requests to one or more endpoints connected to the ring fabric via the RIU;
   receiving, by the RIU, corresponding responses to the plurality of requests; and
   determining, by the RIU, that there are not any outstanding requests following a quiesce of the hardware application based on the responses.

3. The method of claim 1, further comprising:
   recording, by the SLC, an amount of data transferred during execution of the first job and an amount of time spent executing the first job.

4. The method of claim 2, further comprising:
   controlling, by the SLC, access to information contained in the plurality of virtual function queues without allowing the hardware application to directly manipulate the workings of the queues; and
   inhibiting, by the RIU, requests issued by the hardware application from being forwarded on the ring fabric based on control provided by the SLC such that traffic on the ring fabric is not disturbed by the hardware application undergoing the quiesce.

5. The method of claim 2, further comprising:
   tagging, by the RIU, each of the requests with an identifier signifying the virtual function queue storing the first job, wherein the RIU correlates the requests and corresponding responses based on the identifier.

6. The method of claim 2, further comprising:
   signaling, by the RIU to the SLC, that the RIU is in a request neutral state in response to the determination that there are not any outstanding requests; and
   resetting, by the SLC, the hardware application when the RIU is in the request neutral state.

7. The method of claim 5, wherein the SLC provides the identifier to the RIU.

8. The method of claim 5, wherein the identifier is generated by hashing a unique identifier representing the VM that created the first job.

9. The method of claim 3, further comprising:
   initiating, by the SLC, a quiesce operation on the RIU when the amount of time taken by the hardware application to complete execution of the first job exceeds a threshold established by a protected process.

10. The method of claim 3, further comprising:
    transmitting, by the SLC, the recorded amount of data transferred during execution of the first job and the amount of time spent executing the first job at the completion of the first job.

11. The method of claim 1, further comprising:
    reporting, by the RIU to the SLC, in response to occurrence of an error when accessing the ring fabric.

12. The method of claim 11, wherein the error comprises at least one of a parity violation and a protocol violation.

13. The method of claim 1, wherein the SLC controls the RIU by issuing a plurality of bus management signals.

14. The method of claim 13, wherein the plurality of bus management signals include a quiesce signal, a reconfiguration signal, and a virtual function identifier signal.

15. The method of claim 1, further comprising:
    controlling, by the SLC, the hardware application so that the hardware application is reset after completing the first job.

* * * * *